(12) United States Patent
Dickey et al.

(10) Patent No.: US 6,189,896 B1
(45) Date of Patent: Feb. 20, 2001

(54) CONTROLLED LEAKAGE ROTATING SEAL RING WITH ELEMENTS FOR RECEIVING AND HOLDING A LUBRICANT ON A FACE THEREOF

(75) Inventors: Alan M. Dickey, Brimfield, IL (US); Kristy J. Johnson, Bellingham, MA (US); David K. Perry, Rome, IL (US)

(73) Assignee: Caterpillar Inc., Peoria, IL (US)

(*) Notice: Under 35 U.S.C. 154(b), the term of this patent shall be extended for 0 days.

(21) Appl. No.: 09/287,780

(22) Filed: Apr. 8, 1999

(51) Int. Cl.$^7$ .................................................. F16L 17/06
(52) U.S. Cl. ........................ 277/608; 277/399; 277/400
(58) Field of Search ................................... 277/608, 399, 277/400, 627, 650

(56) References Cited

U.S. PATENT DOCUMENTS

| 3,640,541 | 2/1972 | Taschenberg . |
|---|---|---|
| 3,744,805 | 7/1973 | Heinrich . |
| 3,930,655 | * 1/1976 | Fern . |
| 4,145,058 | 3/1979 | Hady et al. . |
| 4,420,162 | 12/1983 | Yanai et al. . |
| 4,444,399 | 4/1984 | Yanai et al. . |
| 4,447,063 | 5/1984 | Kotzur et al. . |
| 4,972,986 | * 11/1990 | Lipschitz . |
| 5,066,026 | 11/1991 | Heck et al. . |
| 5,090,712 | 2/1992 | Pecht et al. . |
| 5,092,612 | 3/1992 | Victor et al. . |
| 5,180,173 | 1/1993 | Kimura et al. . |
| 5,195,757 | 3/1993 | Dahll . |
| 5,201,531 | 4/1993 | Lai . |
| 5,492,341 | 2/1996 | Pecht et al. . |
| 5,496,047 | 3/1996 | Goldswain et al. . |
| 5,556,111 | 9/1996 | Sedy . |
| 5,558,341 | * 9/1996 | McNickle et al. . |

FOREIGN PATENT DOCUMENTS

| 0 578 377 A1 | 1/1994 | (EP) . |
|---|---|---|
| 1269530 | 4/1972 | (GB) . |
| 1416487 | 12/1975 | (GB) . |
| 1494595 | 12/1977 | (GB) . |
| WO 95/06212 | 3/1995 | (WO) . |

* cited by examiner

Primary Examiner—Terry Lee Melius
Assistant Examiner—William L. Miller
(74) Attorney, Agent, or Firm—Stephen R. Matthews

(57) ABSTRACT

A seal ring mountable to a rotating member for rotation therewith, the seal ring including a gap or other feature providing controlled leakage therethrough, a radial inner circumferential face, an opposite radial outer circumferential face, and at least one axial end face extending between the inner circumferential face and the outer circumferential face, wherein at least one face includes elements for receiving and holding a lubricant for providing lubrication between the face and a surface located in opposing relation thereto during rotation of the seal ring relative to the surface.

18 Claims, 3 Drawing Sheets

CONTROLLED LEAKAGE ROTATING SEAL RING WITH ELEMENTS FOR RECEIVING AND HOLDING A LUBRICANT ON A FACE THEREOF

TECHNICAL FIELD

This invention relates generally to a rotating seal ring, and more particularly, to a rotating seal ring that allows a controlled amount of leakage in cooperation with elements or means for receiving and holding a lubricant at at least one interface between the seal ring and an opposing surface of a housing or case containing the seal ring for improved operation, particularly under high pressure and high rotational speed conditions.

BACKGROUND ART

Currently, rotating seal rings are used in applications such as in transmissions, particularly for preventing or substantially limiting fluid leakage and pressure loss from portions of the transmissions subject to high pressure conditions, such as the clutch packs, wherein pressure can be as high as 400 pounds per square inch (PSI). Generally, the known rotating seal rings for sealing transmission clutch packs are "wet seals", that is, both the high pressure and low pressure faces or sides thereof are exposed to or are in communication with a liquid such as a transmission oil or the like typically having lubricating properties. The rotating seal rings further often include at least one face or side that is positioned in opposing, face-to-face relation with a non-rotating surface of the transmission case for forming a sealed or substantially sealed condition therewith. The known rotating seal rings are typically made of a metal or hard polymer such as polyimide, and the opposing surfaces of the transmission case are typically metal, such as cast iron or the like.

A problem that can occur with the known rotating seal rings when subject to the above referenced high pressure conditions, is that they can be forced by the pressure against the non-rotating metal surface or surfaces of the transmission case without adequate lubrication therebetween, resulting in possible damage to the seal ring, and operational problems including excessive leakage and parasitic power losses, clutch slippage, and eventual failure of the associated clutch pack and/or the transmission. This problem is particularly acute at higher rotational speeds wherein higher temperatures are generated between the seal ring and the opposing surface or surfaces due to friction resulting from the inadequate lubrication.

Accordingly, the present invention is directed to overcoming one or more of the problems as set forth above.

DISCLOSURE OF THE INVENTION

According to one aspect of the invention, a rotating seal ring is disclosed, the rotating seal ring including elements or means for receiving and holding a lubricant on at least one face thereof for providing lubrication between the at least one face and a non-rotating surface of a transmission case or the like located in face-to-face relation therewith during relative rotation of the seal ring and the surface. According to a further aspect of the invention, the seal ring includes a gap therethrough adapted for allowing a controlled amount of liquid to pass through the seal ring for supplying the lubricant to the at least one face and for providing a desired cooling effect.

According to a preferred aspect of the invention, the means for receiving and holding a lubricant include a substantially uniform pattern of cavities in or on the at least one face spaced from a radial outer circumferential face of the seal ring.

According to another preferred aspect of the invention the cavities are arranged in a cross-hatch pattern and extend radially outwardly from a radial inner circumferential face of the seal ring to a location spaced from a radial outer circumferential face thereof. Optionally, the cavities are of varying depth, being deeper adjacent to the inner circumferential face and shallower adjacent to the outer circumferential face.

BEST MODE FOR CARRYING OUT THE INVENTION

Figure 1:
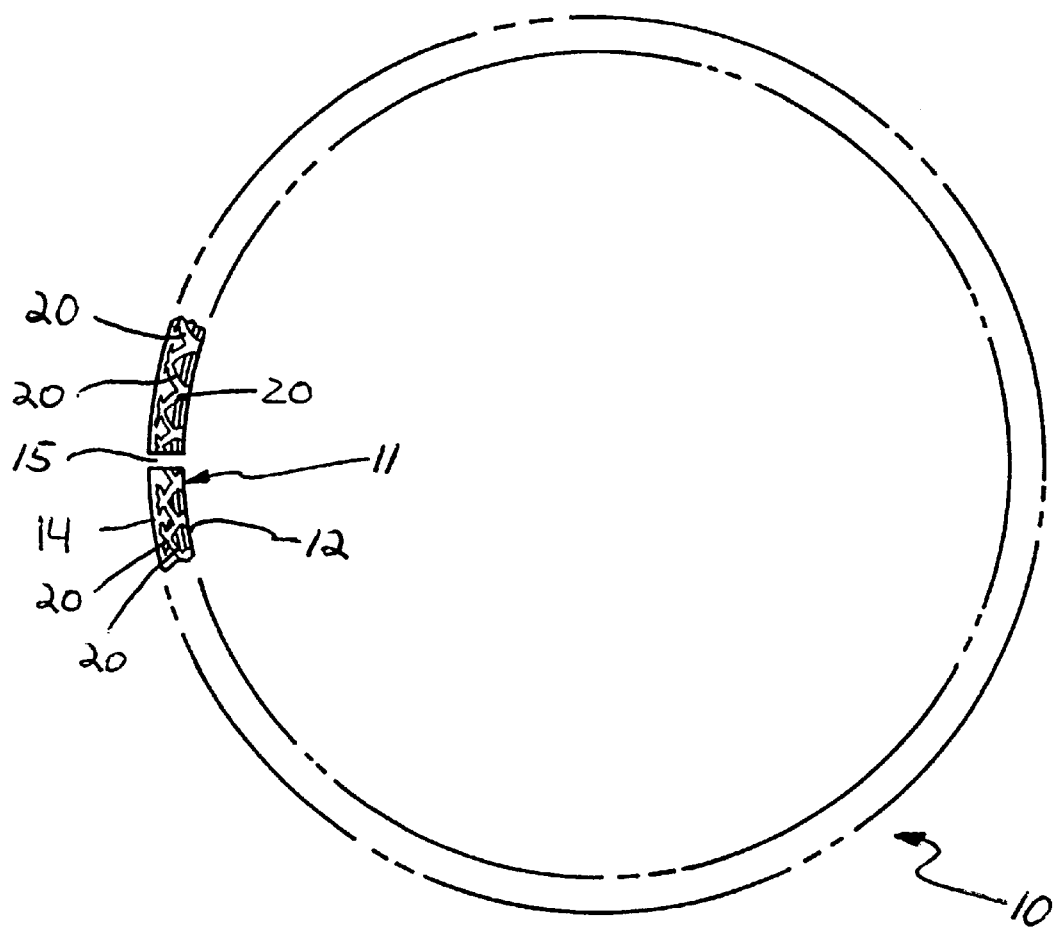
FIG. 1 is an axial view of a controlled leakage rotating seal ring including elements for receiving and holding a lubricant according to the present invention.
Figure 2:
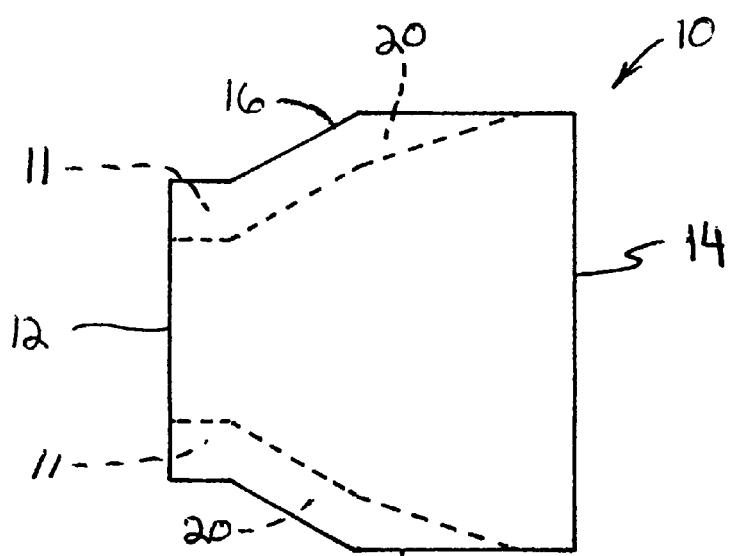
FIG. 2 is an end view of the controlled leakage rotating seal ring of FIG. 1.
Figure 3:
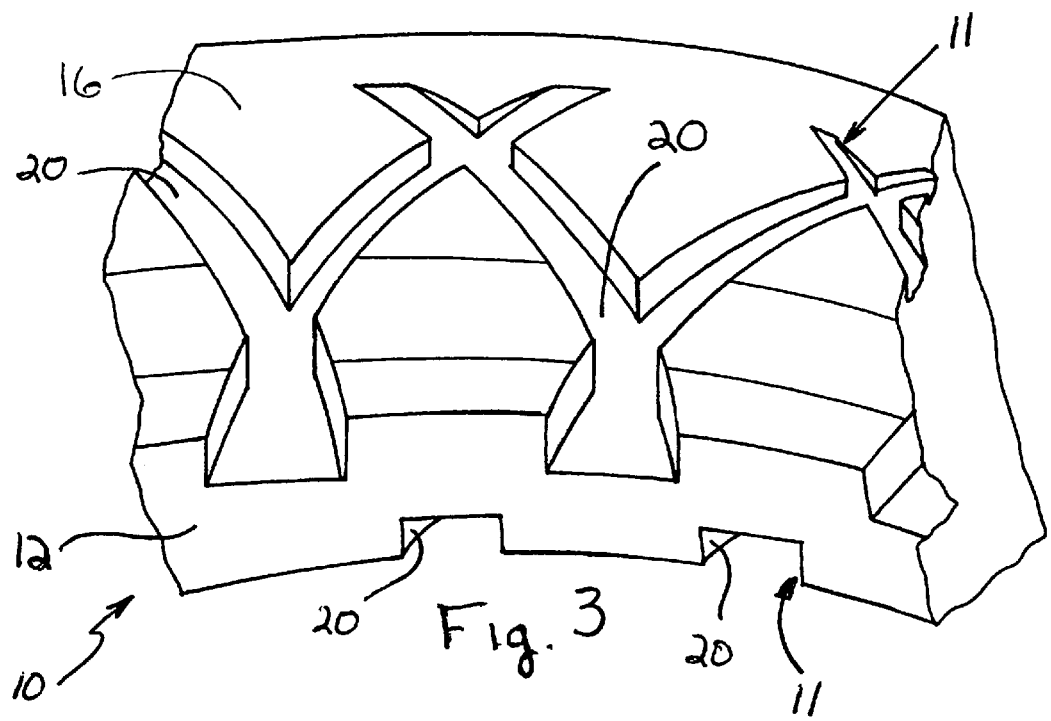
FIG. 3 is a fragmentary perspective view of the controlled leakage rotating seal ring of FIG. 1.

Referring now to the drawings, a controlled leakage rotating seal ring 10 is shown in FIGS. 1, 2, and 3 including elements for receiving and holding or retaining a lubricant 11 constructed and operable according to the present invention. Elements 11 are adapted for providing lubrication of an interface between controlled leakage rotating seal ring 10 and at least one opposing, non-rotating surface of a housing or case containing seal ring 10, such as, but not limited to, a transmission case or the like (not shown). Here, it should be understood that by the term "controlled leakage" it is meant that seal ring 10 is operable to allow a controlled or limited amount of liquid therepast. Also, seal ring 10 is a "wet seal" as that term is defined hereinabove. Further, it should be understood that by the term "rotating", it is meant that seal ring 10 is contemplated to be mounted about a rotating shaft or other member (not shown) for rotation therewith relative to the opposing non-rotating surface or surfaces. The transmission case or other housing containing seal ring 10 will contain a liquid lubricant (also not shown), such as a transmission oil or the like, in the conventional manner. Elements 11 are adapted for receiving and holding or retaining a quantity of the lubricant for lubricating the interface with the opposing non-rotating surface or surfaces, particularly under high operating pressures and rotational speeds, such as typically encountered when seal ring 10 is used for sealing a cavity containing a clutch pack (also not shown) of the transmission.

Seal ring 10 includes a radial inner circumferential face 12 adapted to be positioned about the rotating shaft or other member, a radial outer circumferential face 14 located opposite face 12, and a gap 15 extending through the seal ring 10. Additionally, seal ring 10 includes a first axial end face 16 and a second axial end face 18 opposite the first axial end face 16, as shown in FIG. 2. End face 16 and end face 18 are each adapted to be positioned in intimate opposing, face-to-face relation with a non-rotating axial surface of a transmission case or other housing, in the conventional manner.

The elements for receiving and holding a lubricant 11 are located on faces 16 and 18 of seal ring 10. The elements 11 include a plurality of cavities in the respective faces 16 and 18 arranged in a cross-hatch pattern and extending radially outwardly from radial inner circumferential face 12 to a location spaced from radial outer circumferential face 14. The cavities 20 are each adapted for receiving a liquid lubricant such as transmission oil or the like, and for retaining or holding the lubricant, so as to provide effective lubrication at the interface between the respective axial end face 16 or 18 and the opposing non-rotating surface of the transmission case or other housing during the rotation of seal ring 10 under high pressure conditions and high rotational speeds. Further, a controlled amount of the oil is allowed to leak through seal ring 10 via gap 15, some of which oil is received in the cavities 20 to replenish lost oil and some of which forms a lubricating film at the interface between the respective axial end face 16 or 18 and the opposing non-rotating surface. The oil also effectively serves to cool seal ring 10. Note here that cavities 20 each have a varying width and depth which are greater adjacent to inner circumferential face 12 and less adjacent to outer circumferential face 14. This serves to control the amount of oil that is allowed to move through cavities 20 toward the outer circumferential face 14, for controlling the amount of leakage allowed past the axial end face 16 or 18. The preferred cavities 20 each have a depth dimension as measured into seal ring 10 from the axial end face 16 or 18 ranging from about 0.0625 millimeters (mm) to about 0.5 mm, and the cavities 10 terminate at a location about 0.50 mm from outer circumferential face 14.

Figure 4:
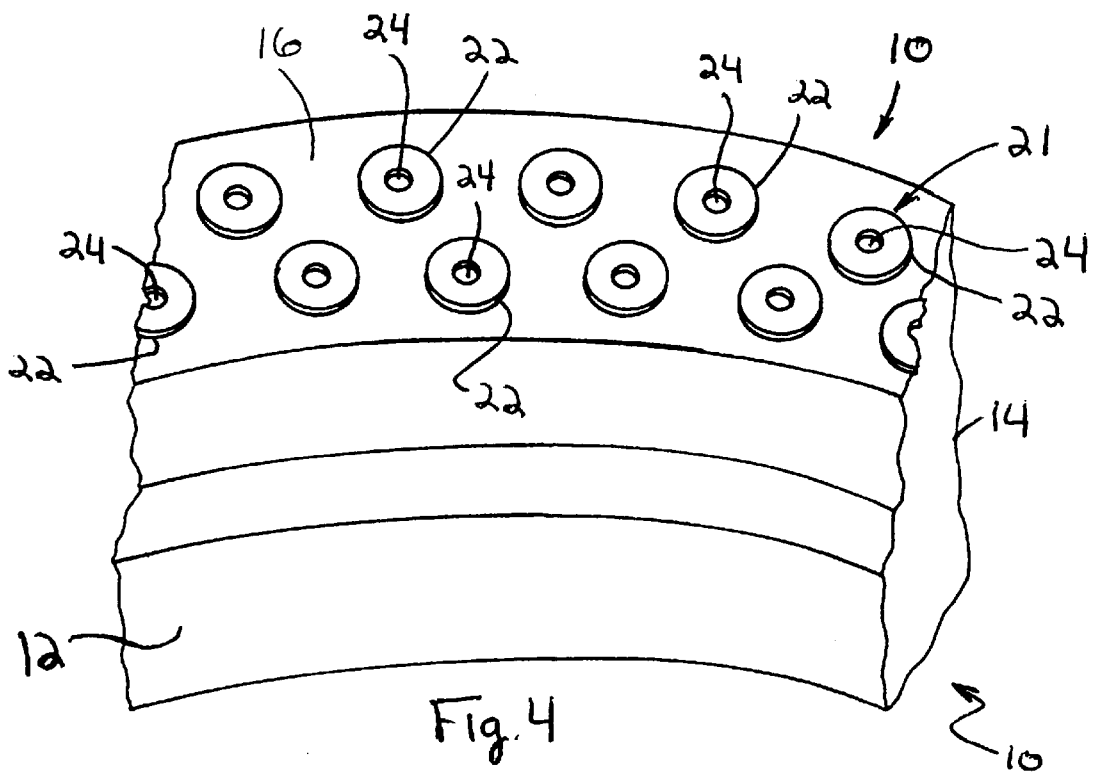
FIG. 4 is a fragmentary perspective view of the controlled leakage rotating seal ring of FIG. 1 including alternative elements for receiving and holding a lubricant according to the present invention.

Turning to FIG. 4, rotating seal ring 10 is shown including other elements for receiving and holding a lubricant 21 according to the present invention on axial end face 16. Elements 21 include a plurality of spaced, raised annular portions 22 each defining a reservoir 24 adapted for receiving and holding a quantity of a lubricant for providing lubrication between axial end face 16 and an opposing non-rotating surface of a transmission case or other housing. Here, the spaced, raised characteristics of annular portions 22 serve to provide a greater space between axial end face 16 and the opposing surface of a transmission case or other housing, which greater space provides a passage for the flow of oil over surface 16 during rotation of the seal ring 10, to provide additional lubrication and cooling. Additionally, the space between raised annular portions 22 allows a greater amount of lubricant to pass from adjacent inner circumferential face 12 to outer circumferential face 14, thereby providing a greater potential for leakage across end face 16.

Figure 5:
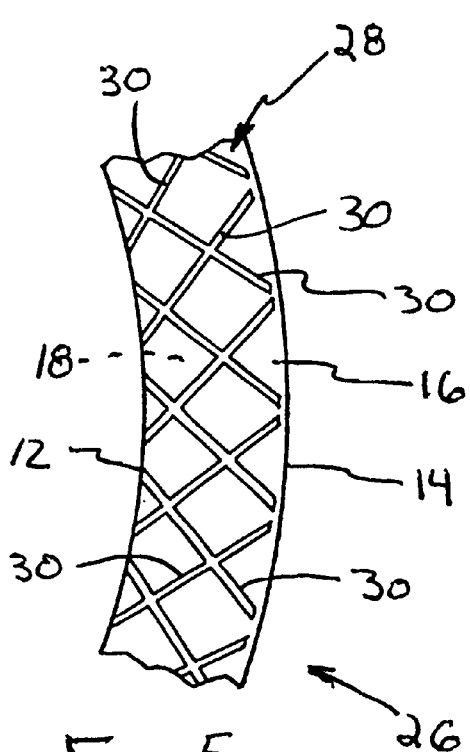
FIG. 5 is a fragmentary axial view of another controlled leakage rotating seal ring including still other elements for receiving and holding a lubricant according to the present invention.

FIG. 5 shows another rotating seal ring 26, like parts of seal ring 26 and seal ring 10 being identified by like numbers. Seal ring 26 includes a radial inner circumferential face 12, a radial outer circumferential face 14, a first axial end face 16, and an opposite second axial end face 18. Seal ring 26 also includes a gap (not shown) therethrough, like gap 15 of seal ring 10. Importantly, seal ring 26 includes elements for receiving and holding a lubricant 28 according to the invention on axial end face 16, elements 28 including a cross-hatch pattern of elongate cavities 30 in axial end face 16 extending from inner circumferential face 12 to a location spaced from outer circumferential face 14 for providing lubrication between axial end face 16 and an opposing surface of a transmission case or other housing in the above described manner.

Figure 6:
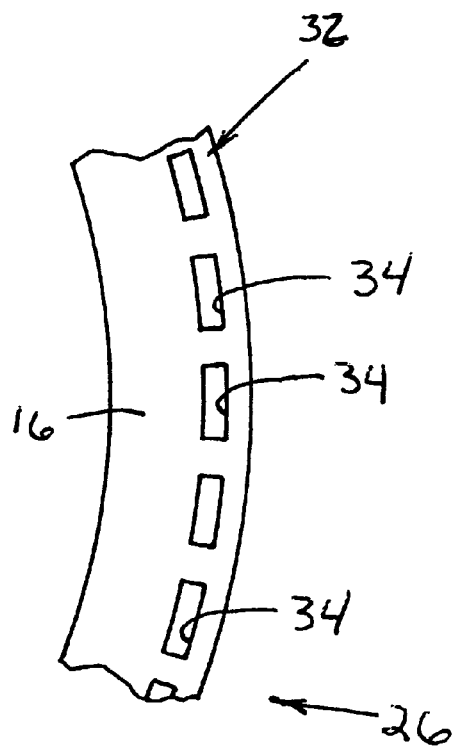
FIG. 6 is another fragmentary axial view of the controlled leakage rotating seal ring of FIG. 5 including still other elements for receiving and holding a lubricant according to the present invention.

Turning to FIG. 6, rotating seal ring 26 is shown including still other elements for receiving and holding a lubricant 32 according to the invention on axial end face 16 thereof. Elements 32 include a circumferentially spaced array of generally rectangular shaped cavities extending into face 16, each cavity 34 defining a reservoir adapted for receiving and holding a quantity of lubricant for providing lubrication between face 16 and an opposing non-rotating surface of a transmission case or other housing in the above described manner.

Figure 7:
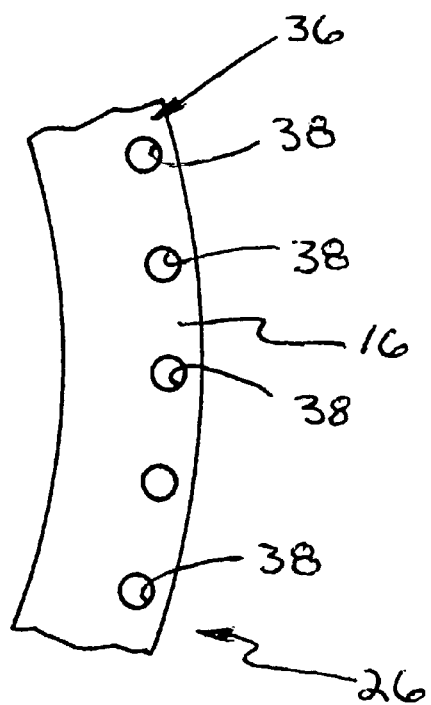
FIG. 7 is another fragmentary axial view of the controlled leakage rotating seal ring of FIG. 5 including other elements for receiving and holding a lubricant according to the present invention.

FIG. 7 shows rotating seal ring 26 including still further elements for receiving and holding a lubricant 36 according to the invention on axial end face 16. Means 36 include a plurality of uniformly circumferentially spaced generally round shape cavities 38 in face 16, each cavity 38 defining a reservoir adapted for receiving and holding a quantity of lubricant for providing lubrication between face 16 and an opposing surface of a transmission case or other housing in the above described manner.

Figure 8:
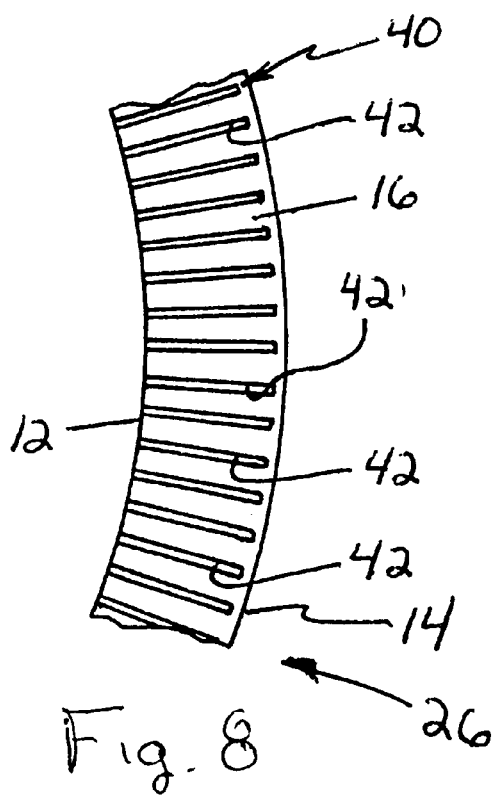
FIG. 8 is still another fragmentary axial view of the controlled leakage rotating seal ring of FIG. 5 including other elements for receiving and holding a lubricant according to the present invention.

Referring to FIG. 8, rotating seal ring 26 is shown including another alternative elements for receiving and holding a lubricant 40 according to the present invention on axial end face 16. Elements 40 include a uniformly circumferentially spaced array of elongate cavities 42 in face 16, each of which cavities 42 extends from inner circumferential face 12 to a location spaced from outer circumferential face 14. Each cavity 42 is adapted for receiving and holding a quantity of lubricant for providing lubrication between face 16 and an opposing surface of a transmission case or other housing in the above described manner.

Here, it should be understood that it is contemplated that elements 11, 21, 28, 32, 36 and 40 can be provided on either or both axial end faces 16 and 18 of a rotating seal ring, including but not limited to, rotating seal rings 10 and 26 shown in the drawings and discussed herein above. Furthermore, it is contemplated that elements 11, 21, 28, 32, 36 and 40 can be utilized on rotating seal rings made from any of a variety of materials, including, but not limited to, materials that can withstand high pressure and speed conditions commonly encountered in transmissions for large work machines such as bulldozers, off-highway trucks and the like. Exemplary materials for such rotating seal rings 10 and 26 can be selected from the group consisting of polyimide, PTFE, iron and other metals, polyether ether ketone, polyamide, polyphenylene sulfide and polyamide-imide. Still further, it should be understood that it is contemplated that the elements 11, 21, 28, 32, 36 and 40 can be provided on a rotating seal ring using any suitable conventional manufacturing technique, including, but not limited to, injection molding, transfer molding, compression molding, direct forming, or machining of the seal ring, as desired.

INDUSTRIAL APPLICABILITY

The present invention has utility for a wide variety of rotating seal ring applications, particularly for use in association with the clutch packs of the transmissions for large work machines such as bulldozers, off-highway trucks and the like, wherein the seals can be subject to pressure conditions as high as 400 psi, as well as high rotational speed conditions. In operation, the elements according to the invention for receiving and holding a lubricant maintain a supply of the lubricant, such as transmission fluid, or other oil, at the interface between an axial face of the rotating seal ring and an opposing, non-rotating surface of a transmission case or other housing for providing lubrication between the axial end face and the surface under the above referenced high pressure conditions and high rotational speed conditions, to prevent degradation and eventual damage of the seal, and resultant operational problems, such as leakage, parasitic power losses, clutch slippage and eventual premature failure of a clutch and/or transmission.

Other aspects, objects and advantages of the present invention can be obtained from a study of the drawings, the disclosure and the appended claims.

What is claimed is:

1. A seal ring mountable to a rotating member for rotation therewith, comprising:
    a radial inner circumferential face, an opposite radial outer circumferential face, and at least one axial end face extending between the inner circumferential face and the outer circumferential face, wherein the at least one axial end face includes elements for receiving and holding a lubricant for providing lubrication between the at least one axial end face and a surface located in opposing relation thereto during rotation of the seal ring relative to the surface; and
    a gap extending through the seal ring and adapted for promoting a controlled amount of said lubricant to pass through the seal ring during the rotation thereof whereby at least a portion of said lubricant passing through the seal ring is received by said elements for receiving and holding a lubricant.

2. The seal ring of claim 1 wherein said elements for receiving and holding a lubricant comprise cavities in the at least one axial end face arranged in a cross hatch pattern and extending radially outwardly from the radial inner circumferential face to a location spaced from the radial outer circumferential face.

3. The seal ring of claim 2 wherein said cavities are deeper adjacent to the radial inner circumferential face and shallower at the location spaced from the radial outer circumferential face.

4. The seal ring of claim 2 wherein each of said cavities has an elongate, curved shape.

5. The seal ring of claim 1 wherein said elements for receiving and holding a lubricant comprise a substantially uniform pattern of circumferentially spaced cavities on the at least one axial end face.

6. The seal ring of claim 5 wherein each of the cavities is defined by a raised member on the axial end face.

7. The seal ring of claim 5 wherein each of the cavities extends into the axial end face.

8. The seal ring of claim 1 wherein said elements for receiving and holding a lubricant comprise a plurality of uniformly circumferentially spaced cavities in the at least one axial end face extending radially outwardly from the radial inner circumferential face to a location spaced from the radial outer circumferential face.

9. The seal ring of claim 1 wherein at least a portion of said seal ring is made from material selected from the group consisting of polyamide, PTFE, metal, polyether ether ketone, polyphenylene sulfide and polyamideimide.

10. The seal ring of claim 1 wherein said elements for receiving and holding a lubricant comprise cavities in the at least one axial end face spaced from the radial outer circumferential face and having a depth of from about 0.0625 mm to about 0.50 mm.

11. The seal ring of claim 1 wherein said elements for receiving and holding a lubricant comprise cavities in the at least one axial end face spaced at least about 0.50 mm from said radial outer circumferential face.

12. A seal ring mountable to a rotating member for rotation therewith relative to a non-rotating surface, comprising:
    a radial inner circumferential face, an opposite radial outer circumferential face, and an axial end face positioned to be located in face-to-face relation with the non-rotating surface during the rotation of the seal ring relative thereto, the end face including elements for receiving and holding a lubricant for providing lubrication between the end face and the surface during the rotation; and
    a gap extending through the seal ring and adapted for promoting a controlled amount of said lubricant to pass through the seal ring during the rotation thereof whereby at least a portion of said lubricant passing through the seal ring is received by said elements for receiving and holding a lubricant.

13. The seal ring of claim 12 wherein said elements for receiving and holding a lubricant comprise cavities in the end face arranged in a cross hatch pattern and extending radially outwardly from the radial inner circumferential face to a location spaced from the radial outer circumferential face.

14. The seal ring of claim 12 wherein said elements for receiving and holding a lubricant comprise a substantially uniform pattern of circumferentially spaced cavities on the end face.

15. A seal ring mountable to a rotating member for rotation therewith, comprising:
    a radial inner circumferential face, an opposite radial outer circumferential face, and at least one axial end face extending between the inner circumferential face and the outer circumferential face, wherein the at least one axial end face includes means for receiving and holding a lubricant for providing lubrication between the at least one axial end face and a surface located in opposing relation thereto during rotation of the seal ring relative to the surface; and
    a gap extending through the seal ring and adapted for promoting a controlled amount of said lubricant to pass through the seal ring during the rotation thereof whereby at least a portion of said lubricant passing through the seal ring is received by said means for receiving and holding a lubricant.

16. The seal ring of claim 15 wherein said means for receiving and holding a lubricant comprise cavities in the at least one axial end face arranged in a cross hatch pattern and extending radially outwardly from the radial inner circumferential face to a location spaced from the radial outer circumferential face.

17. The seal ring of claim 16 wherein said cavities are deeper adjacent to the radial inner circumferential face and shallower at the location spaced from the radial outer circumferential face.

18. The seal ring of claim 15 wherein said means for receiving and holding a lubricant comprise a substantially uniform pattern of circumferentially spaced cavities on the at least one axial end face.

\* \* \* \* \*